United States Patent
Booss et al.

(10) Patent No.: US 10,901,639 B2
(45) Date of Patent: Jan. 26, 2021

(54) MEMORY ALLOCATION IN MULTI-CORE PROCESSORS

(71) Applicant: SAP SE, Walldorf (DE)

(72) Inventors: Daniel Booss, Angelbachtal (DE); Robert Kettler, Heidelberg (DE); Mehul Wagle, Pune (IN); Harshada Khandekar, Pune (IN); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 623 days.

(21) Appl. No.: 15/428,035

(22) Filed: Feb. 8, 2017

(65) Prior Publication Data
US 2018/0150222 A1 May 31, 2018

(30) Foreign Application Priority Data
Nov. 29, 2016 (IN) .............................. 201641040753

(51) Int. Cl.
*G06F 3/06* (2006.01)
*G06F 12/084* (2016.01)

(52) U.S. Cl.
CPC ............ *G06F 3/064* (2013.01); *G06F 3/0604* (2013.01); *G06F 3/0673* (2013.01); *G06F 12/084* (2013.01); *G06F 2212/604* (2013.01)

(58) Field of Classification Search
CPC ...... G06F 3/064; G06F 3/0604; G06F 3/0673; G06F 12/084; G06F 1/00–3296;
(Continued)

(56) References Cited

U.S. PATENT DOCUMENTS 7,120,746 B2 * 10/2006 Campbell ........... G06F 12/0866
                                                           711/130
8,082,397 B1 * 12/2011 Ezra ...................... G06F 12/084
                                                           711/118

(Continued)

OTHER PUBLICATIONS

S. Sarangkar and A. Qasem, "Restructuring parallel loops to curb false sharing on multicore architectures," 2010 IEEE International Symposium on Parallel & Distributed Processing, Workshops and Phd Forum (IPDPSW), Atlanta, GA, 2010, pp. 1-7 (Year: 2010).*

(Continued)

*Primary Examiner* — Daniel C. Chappell
(74) *Attorney, Agent, or Firm* — Mintz Levin Cohn Ferris Glovsky and Popeo, P.C.

(57) ABSTRACT

A system for allocating memory (e.g., heap) in multi-core processors is provided. In some implementations, the system performs operations comprising receiving, at a shared cache having a plurality of segments, a first data allocation including a plurality of data blocks, and allocating at least a first and second data block from the first allocation. First and second segments in the shared cache can each comprise a plurality of data slots (e.g., of equal length). Allocating the first and second data blocks can include storing the first data block in a data slot of the first segment and storing the second data block in a data slot of the second segment. The plurality of data slots which do not contain data may contain padding, and/or the data slots to which the first and second data blocks are allocated are not adjacent. Related systems, methods, and articles of manufacture are also described.

13 Claims, 9 Drawing Sheets

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 8,677,081 B1* | 3/2014 | Wentzlaff | G06F 12/1081 |
| | | | 711/154 |
| 8,739,159 B2* | 5/2014 | Lin | G06F 12/121 |
| | | | 718/1 |
| 10,310,976 B2* | 6/2019 | Chung | G06F 3/0683 |
| 2003/0204698 A1* | 10/2003 | Sachedina | G06F 12/0806 |
| | | | 711/170 |
| 2005/0132144 A1* | 6/2005 | Illikkal | G06F 12/0835 |
| | | | 711/145 |
| 2007/0136509 A1* | 6/2007 | Agami | G06F 3/0616 |
| | | | 711/103 |

OTHER PUBLICATIONS

Kuang-Chih Liu and Chung-Ta King, "On the effectiveness of sectored caches in reducing false sharing misses," Proceedings 1997 International Conference on Parallel and Distributed Systems, Seoul, South Korea, 1997, pp. 352-359 (Year: 1997).*

J. Torrellas, H. S. Lam and J. L. Hennessy, "False sharing and spatial locality in multiprocessor caches," in IEEE Transactions on Computers, vol. 43, No. 6, pp. 651-663, Jun. 1994 (Year: 1994).*

Hegde, R., "Optimizing Application Performance on Intel Core Microarchitecture Using Hardware-Implemented Prefetchers," Intel Developer Zone, <https://software.intel.com/en-us/articles/optimizing-application-performance-on-intel-coret-microarchitecture-using-hardware-implemented-prefetchers>, Updated Jan. 1, 2015.

* cited by examiner

MEMORY ALLOCATION IN MULTI-CORE PROCESSORS

CROSS REFERENCE TO RELATED APPLICATIONS

This application claims priority to Indian Provisional Patent Application No. 201641040753, filed on Nov. 29, 2016, and entitled MEMORY ALLOCATION IN MULTI-CORE PROCESSORS, the disclosure of which is incorporated herein by reference.

FIELD

The subject matter disclosed herein relates to methods and apparatus for, among other things, memory (e.g., heap) allocation in multi-core processors.

BACKGROUND

Multi-core processors are capable of running multiple instructions at the same time, which can increase computing speed, especially for programs amenable to parallel computing. Often, improvements in performance gained by using a multi-core processor can depend on the software algorithms used and their implementation. In certain implementations, multiple cores can share one or more caches, which are much faster to access (e.g., compared to random access memory), but limited in space. Therefore, it may be desirable to provide systems and/or methods for optimizing the allocation of data/instructions in a cache shared among multiple cores.

SUMMARY

In one aspect, a method, computer program product and system are provided. The method, computer program product and system execute operations for allocating memory in multi-core processors. In one variation, the operations can include allocating (e.g., at a shared cache) a plurality of segments including a first segment and a second segment, wherein the first segment is allocated to include a plurality of first slots for data storage and the second segment is allocated to include a plurality of second slots for data storage. The operations can further include receiving data including a plurality of data blocks comprising a first data block and a second data block adjacent to the first data block and/or storing the first data block within a first slot of the plurality first slots. The operations can further include storing the second data block within a second slot of the plurality second slots, wherein the first slot and the second slot are not adjacent and the plurality of first slots (or second slots) that do not contain data instead contain padding.

In some variations the operations can further include maintaining a list comprising indications of slots from the first segment and the second segment which are free or occupied with data. In some variations, the operations can further include receiving second data including a second plurality of data blocks and/or storing the second plurality of data blocks into free slots according to the list. In some implementations, the list can include a continually rolling list using round-robin selection of one or more free slots for storing a next data block from the second plurality of data blocks. In some variations, the operations can further include determining that there is not enough room among the plurality of segments for storing the second plurality of data blocks, allocating at least a third segment and a fourth segment, and/or adding indications to the list corresponding to slots from the third segment and the fourth segment.

In some variations, the operations can further include providing data stored in the first segment for access by a first processing core of a multi-core processor and/or providing data stored in the second segment for access by a second processing core of the multi-core processor.

In some variations, each of the plurality of segments can be 128 bytes in length, each of the plurality of first and second slots are 32 bytes in length, and/or each of the plurality of data blocks can be less than or equal to 32 bytes in length. In some aspects, a computing apparatus comprising the shared cache can form at least a portion of a database management system and/or the database management system can utilize an in-memory database.

In some implementations, storing the second data block within the second slot can comprise determining an offset for a start of the second segment and/or determining an offset for a start of the second slot from the start of the second segment. In some implementations, storing the first data block within the first slot can comprise replacing at least a portion of padding within the first slot with information contained in the first data block, and/or deallocating the first data block from the first data slot can comprise filling the first slot with padding.

Implementations of the current subject matter can include, but are not limited to, systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

Where practical, like labels are used to refer to the same or similar items in the figures.

DETAILED DESCRIPTION

As noted above, computer systems may utilize multi-core processors to increase computing performance. A multi-core processor can include a single computing component with two or more independent processing units called "cores." Each core can include a processing unit configured to read/execute program instructions. These instructions can include ordinary central processing unit (CPU) instructions, such as add, move data, branch, and/or the like. At least a portion of the cores can be configured to run multiple instructions at the same time as each other, decreasing processing time and/or speeding up performance of a computing system. Manufacturers often integrate multiple cores onto a single integrated circuit (IC) die or onto multiple IC dies in a chip package.

In some aspects, cores share one or more data caches. However, doing so can require inter-core communication, which can be costly. Similarly, shared data caches may result in a condition known as "false sharing," where one core loads data from the shared cache that belongs to another core. As such, systems and methods for allocating memory and/or reducing the occurrence of false sharing are provided herein.

Figure 1:
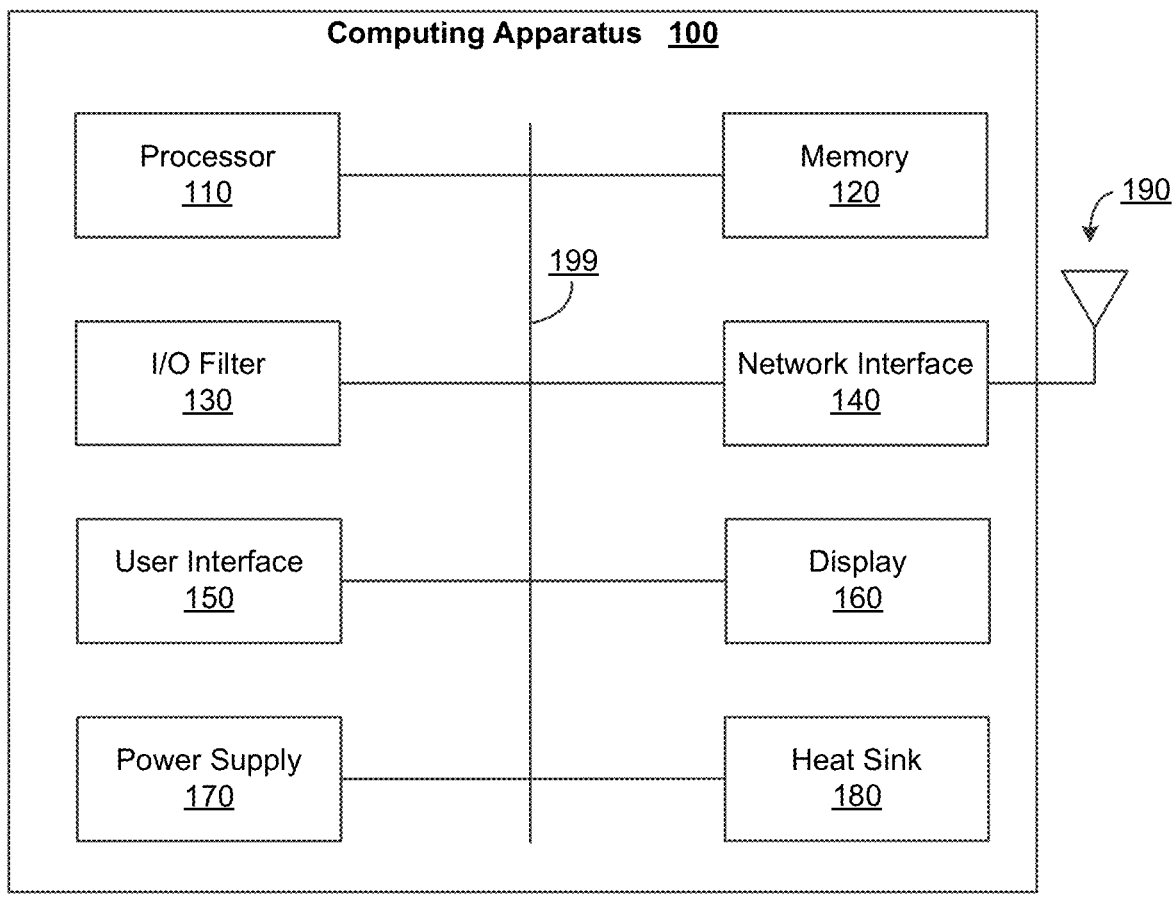
FIG. 1 illustrates a functional block diagram of a computing apparatus for implementing features consistent with the described subject matter, in accordance with some example implementations.

FIG. 1 illustrates an example computing apparatus 100 which may be used to implement one or more of the described devices and/or components, in accordance with some example implementations. Similarly, the computing apparatus 100 may perform one or more of the processes described herein.

As illustrated, computing apparatus 100 may include one or more processors such as processor 110 to execute instructions that may implement operations consistent with those described herein. Apparatus 100 may include memory 120 to store executable instructions and/or information. Memory 120 may include solid-state memory, solid-state disk drives, magnetic disk drives, or any other information storage device. Apparatus 100 may include one or more network interfaces, such as network interface 140, which can be configured to communicate over wired networks and/or wireless networks. Wireless networks may include WiFi, WiMax, Bluetooth, and cellular networks (2G/3G/4G/5G), and/or any other wireless network. In order to effectuate wireless communications, the network interface 140, for example, may utilize one or more antennas, such as antenna 190.

Apparatus 100 may include one or more user interface, such as user interface 150. The user interface 150 can include hardware or software interfaces, such as a keyboard, mouse, or other interface, some of which may include a touchscreen integrated with a display 160. In various implementations, the user interface 150 can include one or more peripheral devices and/or the user interface 150 may be configured to communicate with these peripheral devices.

The apparatus 100 may also comprise and input and output filter 130, which can filter information received from and/or transmitted to a user interface 150, a network interface 140, and/or the like. The apparatus 100 may be powered through the use of one or more power sources, such as power source 170. One or more of the components of the apparatus 100 may be cooled off through the use of one or more heat sinks, such as heat sink 180. As illustrated, one or more of the components of the apparatus 100 may communicate and/or receive power through a system bus 199.

In some implementations, the computing apparatus 100 can be used to implement at least a portion of a database management system. In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

For example, the computing apparatus 100 can provide one or more features of a high-level programming software system or other software that includes database management features. The computing apparatus 100 can also aggregate or otherwise provide a gateway via which users can access functionality provided by one or more external software components. One or more client machines can access the computing apparatus 100, either via a direct connection, a local terminal, or over a network (e.g. a local area network, a wide area network, a wireless network, the Internet, or the like).

The computing apparatus 100 can be configured to access a database that includes at least one table, which can in turn include at least one column. The database table can store any kind of data, potentially including but not limited to definitions of scenarios, processes, and one or more configurations as well as transactional data, metadata, master data, etc. relating to instances or definitions of the scenarios, processes, and one or more configurations, and/or concrete instances of structured data, such as objects that are relevant to a specific instance of a scenario or a process, and the like. The database can be external to the computing apparatus 100 or may be part of the computing apparatus 100 (e.g., at least partially stored in the memory 120). In some aspects, the memory 120 may be utilized to store at least a portion of a database and/or function as an in-memory database.

For example, a processor 110, a network interface 140, and/or a user interface 150 may be configured to receive and/or load a database table or other comparable data set, into the memory 120 (e.g., in response to receipt of a query instantiated by a user or computer system through one or more client machines, external software components, core software platforms, and/or the like).

Figure 2:
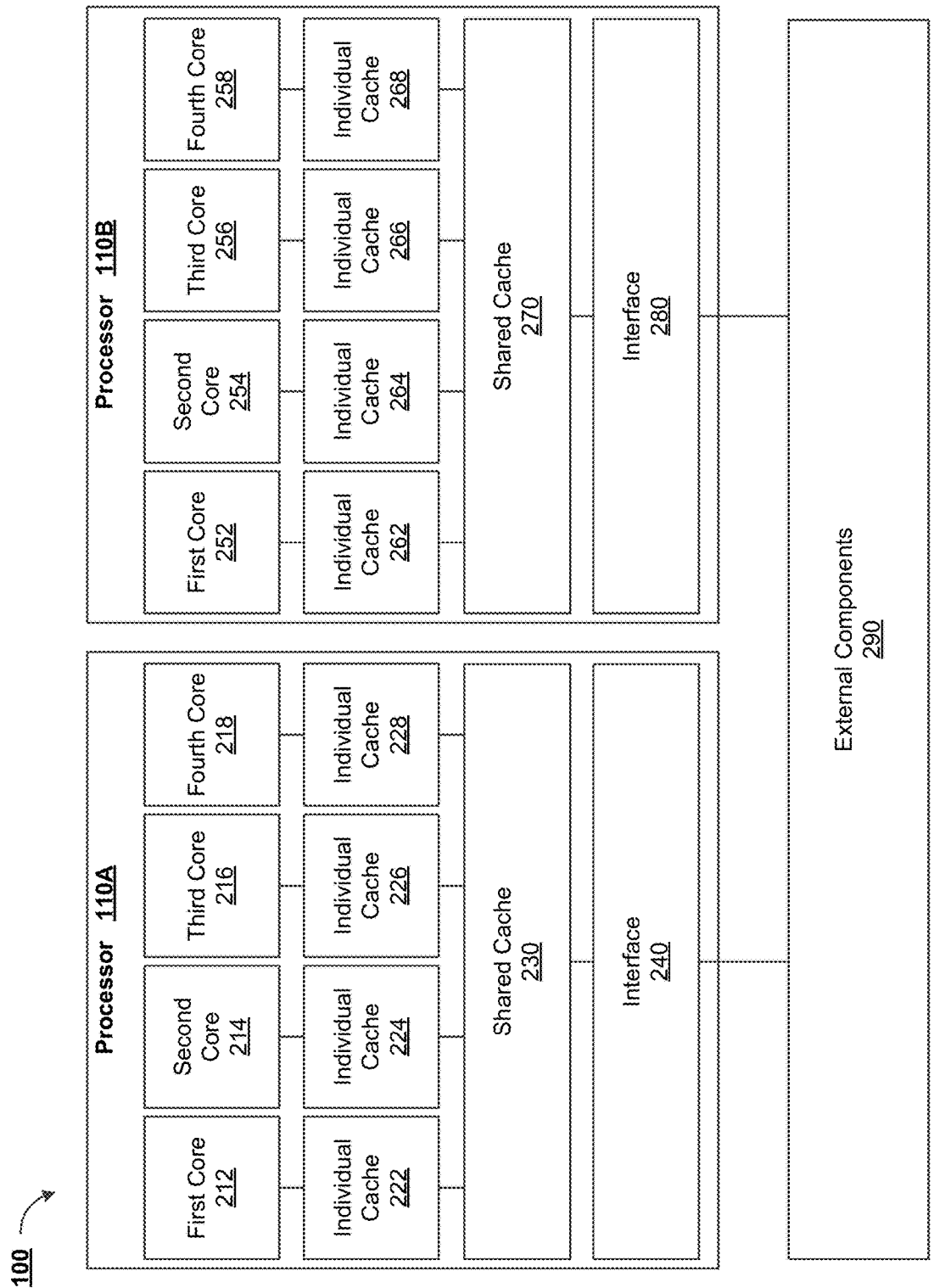
FIG. 2 illustrates a functional block diagram of multiple processors with multiple cores and shared caches, in accordance with some example implementations.

FIG. 2 illustrates a functional block diagram of multiple processors 110A-B with multiple cores and shared caches, in accordance with some example implementations. As illustrated, the processor 110A can include a first core 212, a second core 214, a third core 216, and/or a fourth core 218. Each core can be coupled to (e.g., physically, electrically, operationally, in communication with, etc.) a respective cache. For example, as illustrated, the first core 212 can be coupled to an individual cache 222, the second core 214 can be coupled to an individual cache 224, the third core 216 can be coupled to an individual cache 226, and/or the fourth core 218 can be coupled to an individual cache 228. The individual caches 222-228 can be configured to send, receive, and/or store data/instructions for use by the respective core 212-218. In some aspects, the individual caches 222-228 can be referred to as layer one (L1) caches. In some implementations, at least a portion of the cores 212-218 can be interconnected through the use of one or more of a bus, a ring, a two-dimensional mesh, a crossbar, and/or the like.

In turn, each of the individual caches 222-228 can be coupled to a shared cache 230. In various implementations, the shared cache 230 can store data/instructions for more than one of the cores 212-218. The shared cache 230 can be larger in size than the individual caches 222-228, but slower in operation, as the data/instructions used by the cores 212-218 is generally required to be first loaded into the shared cache 230 and then into an individual cache 222-228 before it can be executed by the respective core 212-218. As further illustrated, the shared cache 230 may be coupled to an interface 240, such as the bus 199 of FIG. 1 or some other interface. The interface 240 can provide a connection to one or more external components 290, such as the memory 120, I/O filter 130, network interface 140, user interface 150, display 160, power supply 170, heat sink 180, antenna 190, and/or the like.

The second processor 110B may operate in a similar manner to the first processor 110A. For example, each of the cores 252-258 can utilized a respective individual cache 262-268, which can each be coupled to the shared cache 270. The shared cache 270 can be coupled to an interface 280, which may be coupled to the one or more external components 290. In some aspects, the processors 110A-B and/or the external components may form at least a portion of the computing apparatus 100 of FIG. 1. As used herein, "external" can mean external to the processors 110A-B and/or external to the computing apparatus 100. Although two processors 110A-B are illustrated, more or less processors 110 can be present in a given implementation. Similarly, although each processor 110 is illustrated as having four cores each, in various implementations, each processor 110 may have more or less cores and it is not required that each processor 110 have the same number of cores. Although only two layers of caches are illustrated, more or less layers are possible (e.g., L1 individual caches, L2 individual or shared caches, and one or more L3 shared caches).

When a core 212-218 needs data from memory, the data must be loaded in its respective individual cache 222. However, in order to load data into the individual caches 222-228, the data must be loaded in the shared cache 230. Further, in order to load the data into the shared cache 230, it must be located and/or retrieved from main memory, such as the memory 120 (which may be off-chip). Storing data in main memory based on an action taking by a core 212-218 generally occurs in the reverse direction. As such, loading data into a cache and/or memory can occur in either direction, even though it may only be described in one direction at times.

Figure 3:
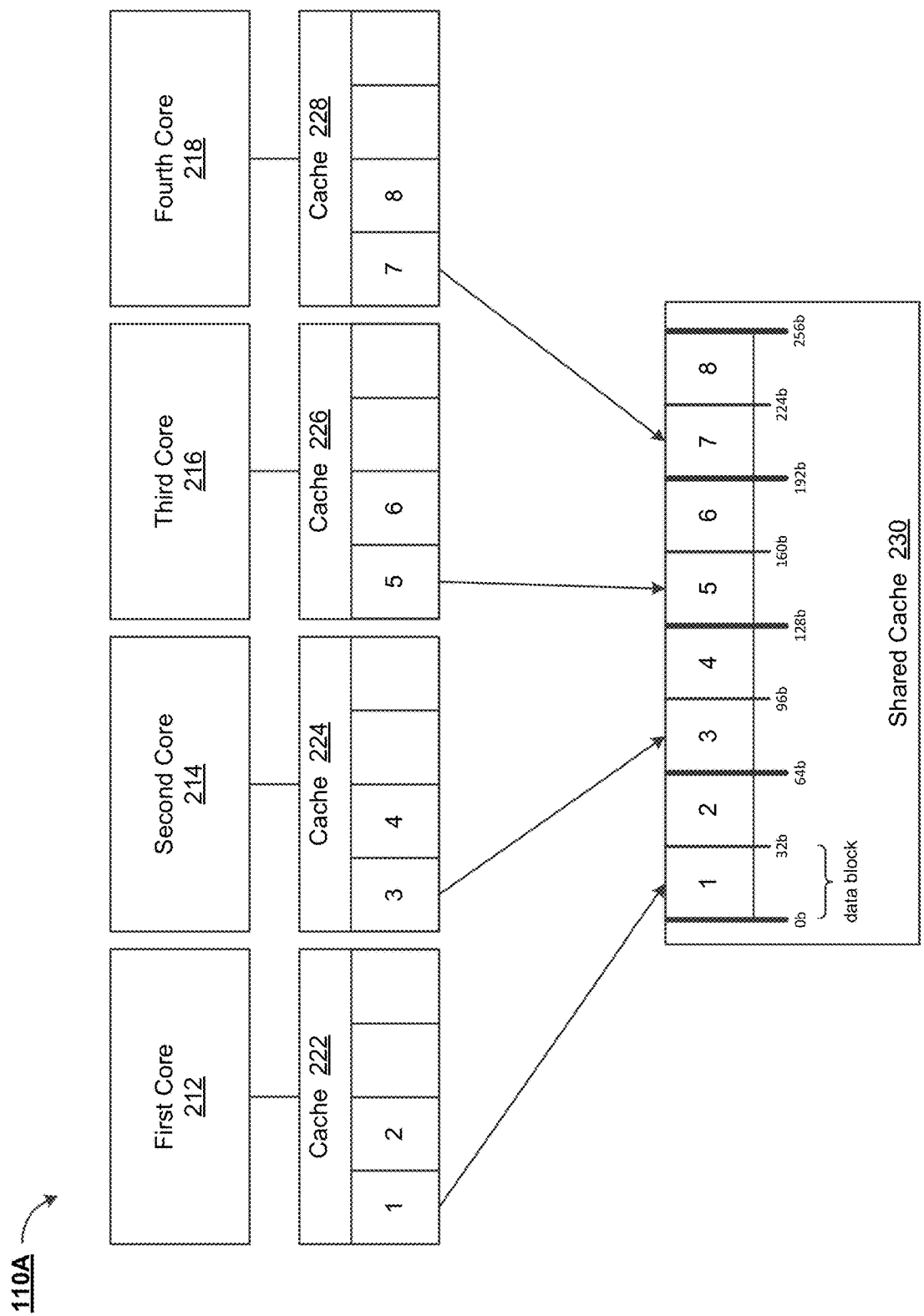
FIG. 3 illustrates a functional block diagram of a processor with multiple cores accessing a shared cache, in accordance with some example implementations.

FIG. 3 illustrates a functional block diagram of the processor 110A with multiple cores 212-218 accessing the shared cache 230, in accordance with some example implementations. As illustrated, the shared cache 230 can include data that is 32 byte (b) aligned and/or can include cache "lines" that are 64 b in length. In some implementations, the processor 110A can be configured to load 64 b cache lines and/or 128 b cache line pairs (e.g., two 64 b cache lines) at a time. For example, as illustrated, the first cache 222 can load a cache line that includes a pair of 32 b data blocks indexed '1' and '2'. In some implementations, a 64 b cache line may be the smallest size of data that a core 212-218 and/or an individual cache 222-228 can operate on.

Even though the first core 212 might not need the information contained in the data block indexed '2' at the time (or at all), loading the full 64 b cache line can increase the speed/performance of the processor 110A. For example, as illustrated, the first core 212 may need data contained within the data block indexed '1', so the first cache 222 may load the data block indexed '1' along with the data block indexed '2'. Although the first core 212 may not need the data block indexed '2' at the time the cache line is loaded, adjacent memory locations are often related in some manner, and it is not uncommon for a core to need data from an adjacent data block at a later time (e.g., in the near future). Thus, loading both data blocks '1' and '2' can be beneficial, as the cache 222 will not be required to retrieve the data block '2' when the core '1' decides that it needs data from this data block, saving processing time and/or resources.

Such techniques can be referred to as cache "prefetching." As processors increasingly become "data hungry," the avoidance of bottlenecks becomes more important. Prefetching is one technique that helps alleviate potential bottlenecks by fetching instructions and/or data from memory into the cache before the processor needs it, thus improving the load-to-use latency and/or decreasing the frequency of memory accesses that would otherwise slow down a processor 110. Prefetching can be performed through the use of a prefetcher circuit within the processor 110A. In some implementations, a prefetcher can be capable of handling multiple streams in the forward and/or backward direction. Prefetching can be selectively enabled/disabled, which can be done manually or based on current conditions. For example, prefetching can be triggered when successive cache misses occur in the last-level cache and/or a stride in the access pattern is detected, such as in the case of loop iterations that access array elements.

Figure 4:
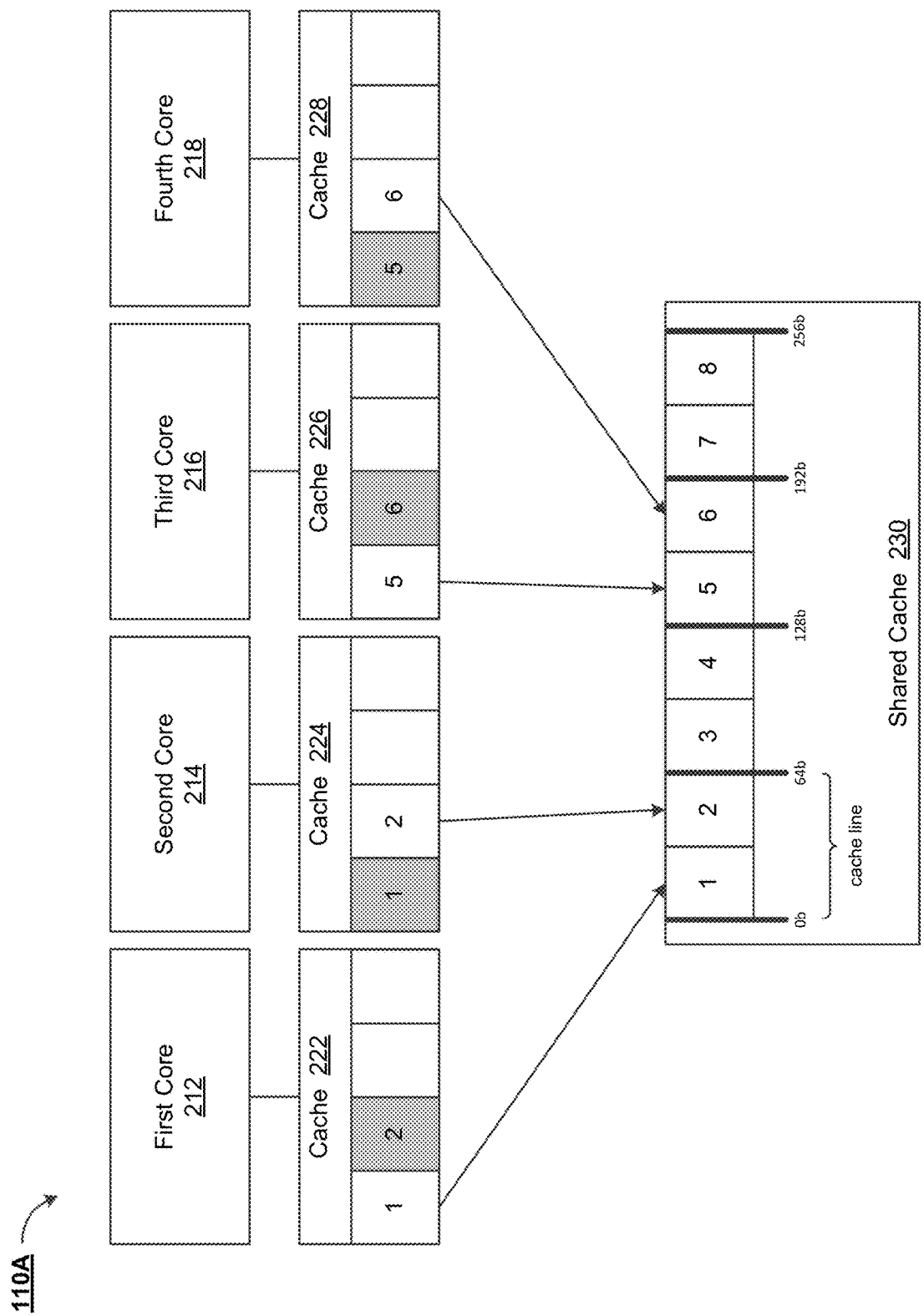
FIG. 4 illustrates another functional block diagram of a multi-core processor accessing a shared cache, in accordance with some example implementations.

Although prefetching can improve the performance of the processor 110A, prefetching can cause false sharing. For example, FIG. 4 illustrates another functional block diagram of the multi-core processor 110A accessing the shared cache 230, in accordance with some example implementations. As illustrated, the first core 212 may need data contained in the data block indexed '1', and the second core 214 may need data contained in the data block indexed '2'. However, if the first core 212 utilizes prefetching, the cache line including both data block '1' and '2' is already loaded in the first cache 222, which can make the cache line inaccessible to the second cache 224. For example, in the event that the first cache 212 needs to perform a read and/or write operation for the data block '2', the processor 110A may want to prohibit the second core 214 from accessing and/or making any modifications to this data block. Thus, a core 212-218 may be prohibited from accessing and/or making any modifications to data blocks held by another core 212-218 (e.g., stored in a corresponding cache 222-228). In the illustrated example, this prohibition can impede the operation of the second core 214 and/or require that at least a portion of the cores 212-218 communicate with each other to synchronize themselves to address this issue. As further illustrated, a similar false sharing issue can occur between the third core 216 and the fourth core 218, as both may need data from the same cache line, even though they actually only need data from separate data blocks (e.g., the adjacent data blocks indexed '5' and '6'). The complications caused by false sharing can increase in magnitude and/or frequency as the number of cores used increases.

Figure 5:
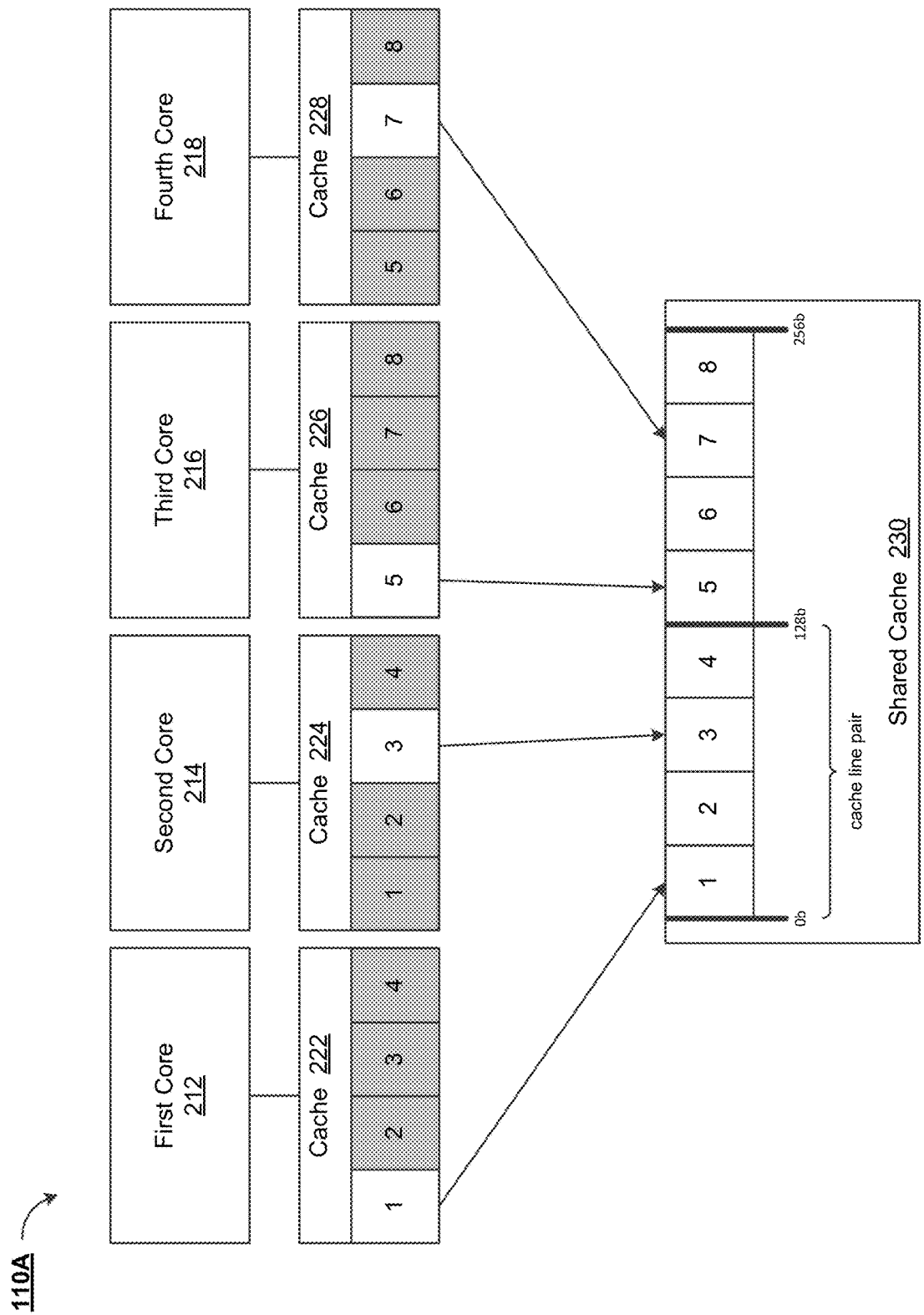
FIG. 5 illustrates another functional block diagram of a multi-core processor accessing a shared cache, in accordance with some example implementations.

Similarly, implementations which load cache line pairs (e.g., instead of just one cache line) can increase the frequency by which false sharing occurs. For example, FIG. 5 illustrates another functional block diagram of the multi-core processor 110A accessing the shared cache 230, in accordance with some example implementations. In the illustrated implementation, each of the individual caches 222-228 load cache line pairs (e.g., two 64 b cache lines). In some aspects, loading cache line pairs can improve performance of the processor 110A even more than loading a single cache line, especially in applications with relatively poor spatial locality. However, the incidence of false sharing can increase, as larger sections of potentially unrelated memory are loaded into each individual cache 222-228. For example, even though each of the cores 212-218 in the implementation illustrated in FIG. 5 need the same data blocks from the shared cache 230 as the cores 212-218 in the implementation illustrated in FIG. 3, each of the cores 212-218 in FIG. 5 may cause a false sharing problem, whereas none of the cores 212-218 in FIG. 3 cause false sharing problems. Although using an alignment other than 32 b is possible, additional space may be wasted by doing so. For example, if the data block indexed '1' only contains 8 b of information, then using 32 b alignment only wastes 24 b of space. However, using a 64 b alignment to avoid placing 32 b aligned data blocks adjacent to each other would cause 88 b of wasted space, which becomes a very large problem for cache memory, which is limited in space.

In some aspects, similar issues can exist with the allocation of main memory, which can exist on a larger scale. The allocation of memory described herein can similarly save space in main memory and/or increase main memory utilization. In some implementations, statistics can be used to track memory allocations (e.g., per allocator and/or per core). In some aspects, 64 b data locations can be used within a main memory. If approximately one million allocators are running on a 1152 core machine, without the striped allocators, and an 128 b alignment, the allocators can consume approximately 137 GB (128 b*1,152*1,000,000) of memory (e.g., in a heap). Instead, if 64 b alignment and/or striped allocation is used, then the same number of allocators could consume approximately 70 GB and on potentially half as much power. Other numbers of allocators, cores, and/or alignment sizes can be used. However, the use of striped allocation can reduce the size of data consumption and/or existing data structures in main memory.

Figure 6:
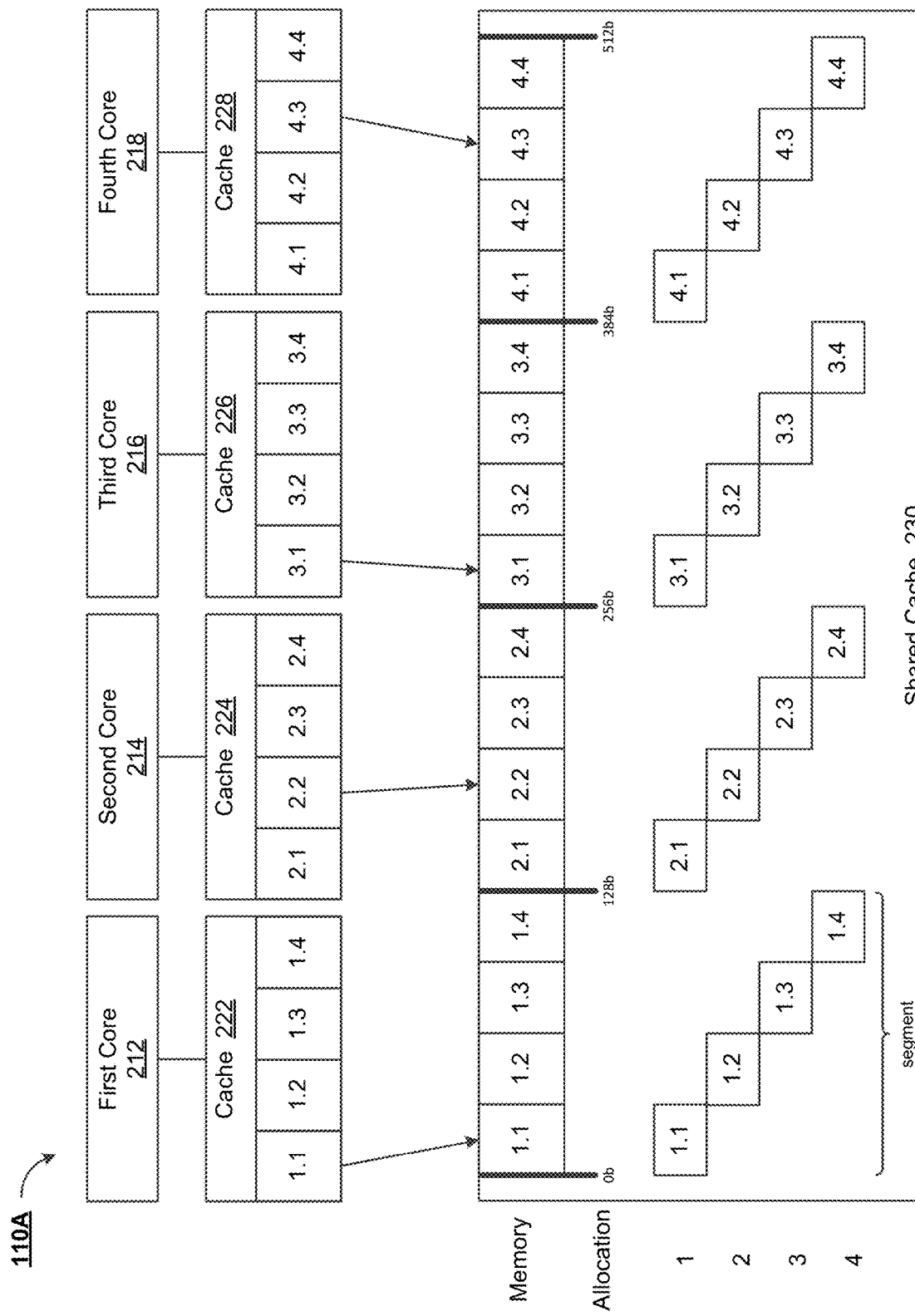
FIG. 6 illustrates another functional block diagram of a multi-core processor accessing a shared cache, in accordance with some example implementations.

In order to reduce the incidence of false sharing, a striped allocation of memory can be utilized. For example, FIG. 6 illustrates another functional block diagram of the multi-core processor 110A accessing the shared cache 230, in accordance with some example implementations. As illustrated, at least a portion of the shared cache 230 can be divided into multiple segments, each containing multiple data blocks. In some implementations, each of the segments can be 128 b and/or can include four 32 b data blocks. When the shared cache 230 is empty, each of the data blocks can contain padding. As data is loaded into the shared cache through data allocations, the padding can be replaced with the data.

Instead of sequentially allocating memory in the shared cache 230, memory can be loaded in a manner that is not contiguous and/or contains spacing among the data blocks. For example, when the shared cache 230 loads data (e.g., from memory 120 or from an individual cache 222-228) in a first allocation, a first block of the data may be loaded into the data block indexed '1.1', another block may be loaded into the data block indexed '2.1', another block may be loaded into the data block indexed '3.1', and another block may be loaded into the data block indexed '4.1'. When a second allocation occurs, a first block from the allocation may be loaded into the data block indexed '1.2', another block may be loaded into the data block indexed '2.2', another block may be loaded into the data block indexed '3.2', and another block may be loaded into the data block indexed '4.2'. Each of the subsequent allocations can occur sequentially in time.

Figure 7:
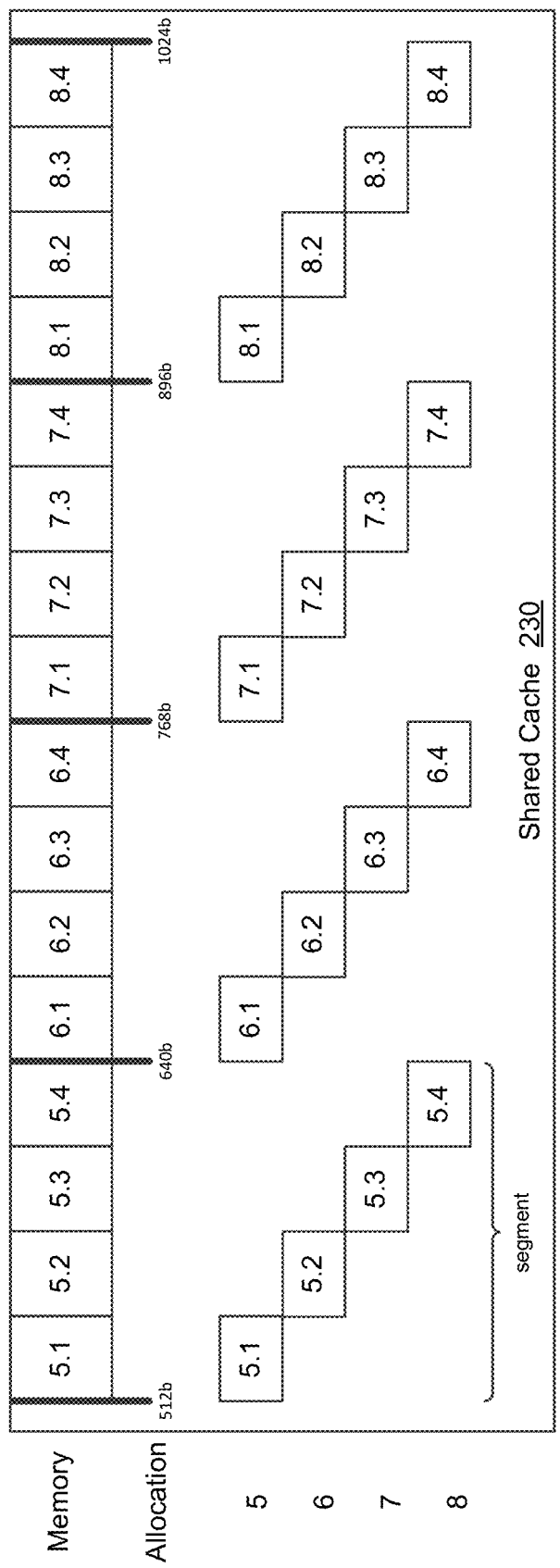
FIG. 7 illustrates another functional block diagram of a multi-core processor accessing a shared cache, in accordance with some example implementations.

A similar process may continue until all of the segments in the shared cache 230 are full (or above a threshold level of used). When the segments are full (or almost full), then additional segments can be formed and/or used for additional allocations. For example, as illustrated in FIG. 7, the shared cache 230 may form/contain additional segments for additional allocations.

Figure 8:
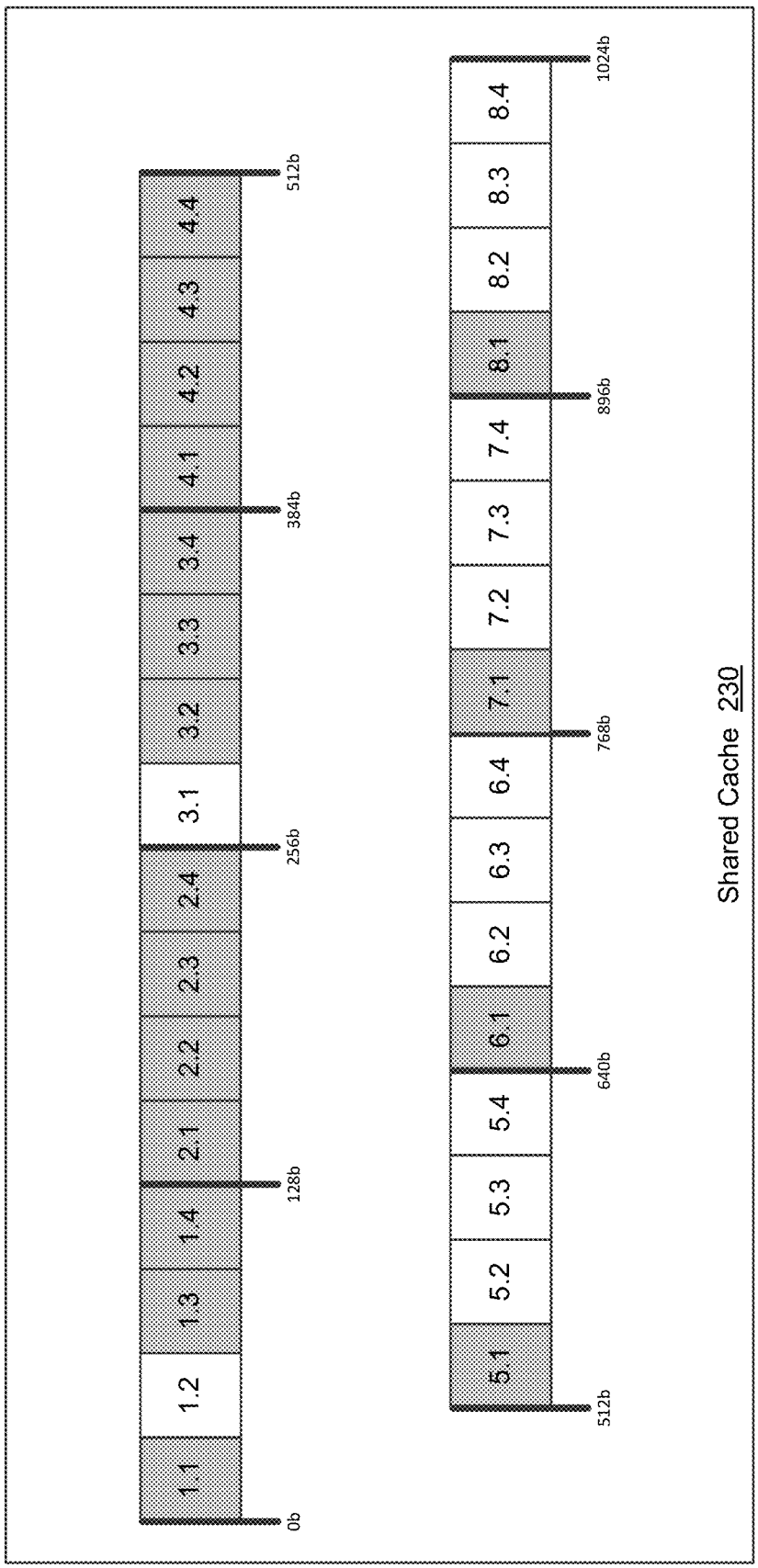
FIG. 8 illustrates another functional block diagram of a multi-core processor accessing a shared cache, in accordance with some example implementations.

Allocation can continue in this manner until data is removed from the shared cache 230 and/or the shared cache 230 needs to make room for more data. In some implementations, the shared cache 230 and/or a separate component can keep track of which data blocks are free or occupied. For example, as illustrated in FIG. 8, data blocks indexed '1.2' and '3.1' may be free, but all of the remaining data blocks in the first four segments may be occupied. The cache 230 and/or another component may keep track of this information in a list, and/or may use the information for subsequent allocations. For example, when the shared cache 230 loads the next allocation in the implementation illustrated in FIG. 8, it may load the first data block for the allocation in the first available space (e.g., data block indexed '1.2'), load the next data block in the next available space (data block indexed '3.1'), and so on (e.g., data blocks indexed '5.2' and '6.2'). Thus, in some aspects, the list can be regarded as a lockless free list. In some aspects, allocation and/or deallocation can be used in a lock free manner, which can allow lock free concurrent access by multiple threads.

In other implementations, the shared cache 230 may continue to load/allocate data until it reaches the end of the shared cache 230 before using the list for subsequent allocations (e.g., data blocks indexed '5.2', '6.2', '7.2', '8.2' would be used for the next allocation in FIG. 8). In some aspects, data blocks can be added to the end of the list when they become available. In any event, the list may be referenced to determine if enough free data blocks are available for a given allocation, and more segments can be created and/or data blocks can be deallocated (e.g., based on a first-in-first-out policy or some other policy). In some implementations, the shared cache 230 may be configured to load data in certain locations based on the core 212-218 that needs the data. For example, the next allocation in FIG. 8 may load information for the first core 212 in the data block indexed '1.2', load information for the second core 214 in the data block indexed '6.2', load information for the third core 216 in the data block indexed '3.1', and load information for the fourth core 218 in the data block indexed '8.2' (assuming the shared cache 230 utilizes the first and fourth segments for the first core 212, the second and fifth segment for the second core 214, and so on). Combinations of these approaches can be used.

In order to implement/access the segments, offsets can be used. For example, if each data block is 32 b in length, and the stored cached 230 is aware that the first two blocks are occupied, then a subsequent allocation may start at the 65$^{th}$ byte (which can be indexed as byte '64').

Referring back to FIG. 6, when a core 212-218 needs data, it can load a segment (or a portion thereof) into its respective individual cache 222-228. Allocating and/or accessing memory according to some of the procedures described can help to reduce the chance of false sharing, which may otherwise be caused through sequentially storing data in the shared cache 230 without padding. Although eight segments with four blocks each are illustrated, in various implementations, any number of segments and/or data blocks per segment are possible. The number of segments and/or data blocks per segment can depend on the size of a data block, the number of cores to allocate for (e.g., the number of cores in the processor 110A), and/or other factors. The illustrated implementations are only examples and are, in many aspects, over-simplifications of multi-core processors.

Figure 9:
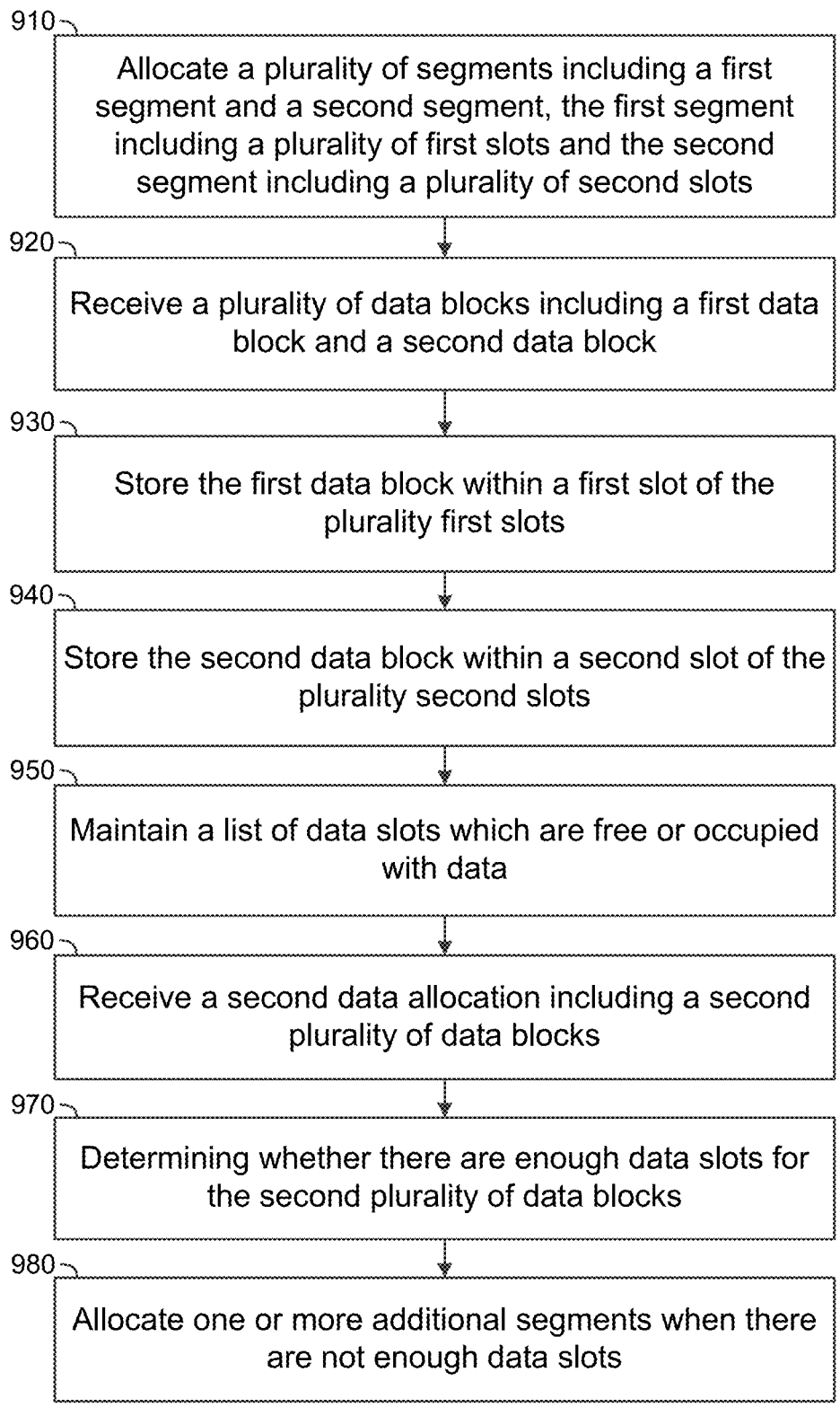
FIG. 9 illustrates a flowchart of a method for allocating memory for a multi-core processor, in accordance with some example implementations.

FIG. 9 illustrates a flowchart of a method 900 for allocating memory in multi-core processors, in accordance with some example implementations. In various implementations, the method 900 (or at least a portion thereof) may be performed by one or more of the components and/or sub-components of the computing apparatus 100. In some aspects, the apparatus 100 may be regarded as a multi-core processing machine.

Method 900 can start at operational block 910 where the apparatus 100, for example, allocates a plurality of segments including a first segment and a second segment, the first segment including a plurality of first slots and the second segment including a plurality of second slots. In some implementations, the allocation can be made at a shared cache (of the apparatus 100, for example). In some implementations, the plurality of segments can be of equal length, such as 32 b, 64 b, 128 b, 256 b, 512 b, 1,024 b, etc. In some variations, the plurality of first slots and/or second slots can be of equal length, such as 8 b, 16 b, 32 b, 64 b, 128 b, etc.

Method 900 can proceed to operational block 920 where the apparatus 100, for example, receives a plurality of data blocks including a first data block and a second data block. In some aspects, the first data block and the second data block can be adjacent to each other (e.g., the two data blocks can lie next to each other within a memory allocation containing a plurality of sequential data blocks that need to be loaded into the shared cache).

Method 900 can proceed to operational block 930 where the apparatus 100, for example, stores the first data block within a first slot of the plurality first slots. The plurality of data slots in the first segment and/or the second segment which do not contain data, can instead contain padding (e.g., nothing or information signifying that data is not being held in the slot, such as all zeros, all ones, etc.). In some implementations, storing the first data block within the first slot can include replacing at least a portion of padding within the first slot with information contained in the first data block. Deallocating the first data block from the first data slot can include filling the first slot with padding or removing the data in some other manner. In some aspects, each of the data blocks can be equal to or less than the size of each of the data slots in the shared cache.

Method 900 can proceed to operational block 940 where the apparatus 100, for example, stores the second data block within a second slot of the plurality second slots. The plurality of data slots in the second segment which do not contain data, can instead contain padding. In some implementations, the data slot in which the first data block is stored is not adjacent to (e.g., not within the length of the data slot away from) the data slot in which the second block is stored.

Method 900 can proceed to operational block 950 where the apparatus 100, for example, maintains a list of data slots which are free or occupied with data. For example, the list can comprise indications of data slots from the first segment and the second segment which are free. In some aspects, the list can be a continually rolling list (e.g., round-robin scheme) and/or a lowest numbered free data slot can be selected for allocation of the next data block. For example, the first data block may have been selected for storage within the lowest numbered data slot, the second data block may have been selected for storage within the next to lowest numbered data slot, and/or whatever the next data block is for allocation may be stored within the current lowest numbered data slot that does not contain data. The numbering of the data slots can be according to the order in which they lie, sequentially, in the shared cache. In some aspects, when the next data slot is selected for storing the next data block, the next data slot can be selected such that it does not lie within the same segment as the previously selected segment. Other allocation methods and/or utilizations of the list are possible. In some aspects, maintaining the list can include adding available data slots to the list, removing the data slots from the list as memory is allocated into the data slots, and/or adding data slots to the list as memory within the data slots are deallocated.

Method 900 can proceed to operational block 960 where the apparatus 100, for example, receives a second data allocation including a second plurality of data blocks. Method 900 can proceed to operational block 970 where the apparatus 100, for example, determines whether there are enough data slots for the second plurality of data blocks.

Thereafter, method 900 can proceed to operational block 980 where the apparatus 100, for example, allocates one or more additional segments when there are not enough data slots. For example, if the second data allocation includes four data blocks and only three data slots are available in the shared cache, then additional segments may be allocated for storage within the shared cache. In some aspects, more segments than a number of segments which are necessary to store the second allocation can be allocated. For example, each time new segments are necessary, a number corresponding to the number of logical processing cores used by a processor in question can be allocated. Method 900 can include allocating the second plurality of data blocks into free data slots according to the list. In some implementations, allocating a data block within a segment can comprise determining an offset for a start of the data slot from a start of the segment containing the data block, and/or storing the data block within the data slot, beginning at the offset. In some implementations, a computing apparatus comprising the shared cache can form at least a portion of a database management system, and/or the database management system can utilize an in-memory database.

Method 900 can additionally or alternatively include the apparatus 100, for example, providing data stored in the first segment for access by a first processing core of a multi-core processor and/or providing data stored in the second segment for access by a second processing core of the multi-core processor. In some implementations, providing data for access can include allowing a processing core and/or another cache to read data stored within the shared cache.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   allocating, at a shared cache, a plurality of segments including a first segment and a second segment, wherein the first segment is allocated to include a plurality of first slots for data storage, wherein the second segment is allocated to include a plurality of second slots for data storage, and wherein each of the plurality of first slots and each of the plurality of second slots is of a fixed slot size;
   receiving, at the shared cache, data including a plurality of data blocks, the plurality of data blocks including a first data block and a second data block adjacent to the first data block, wherein data contained in the first data block is for a first processing core of a multi-core processor, and wherein data contained in the second data block is for a second processing core of the multi-core processor;
   determining a first offset based on a total number of processing cores of the multi-core processor, the fixed slot size, and a first allocation number;
   storing, at the shared cache, the first data block within a first slot of the plurality of first slots of the first segment, wherein a location of the first slot is determined based on a starting location of a memory of the shared cache and the first offset, and wherein the first segment is assigned, by the shared cache, to be accessed by the first processing core of the multi-core processor;
   updating, in response to storing the first data block, the first allocation number to produce a second allocation number;
   determining a second offset based on the total number of processing cores of the multi-core processor, the fixed slot size, and the second allocation number; and storing, at the shared cache, the second data block within a second slot of the plurality of second slots of the second segment, wherein a location of the second slot is determined based on the starting location of the memory of the shared cache and the second offset, wherein the second segment is assigned, by the shared cache, to be accessed by the second processing core of the multi-core processor, and wherein the first slot and the second slot are not adjacent.

2. The method of claim 1, further comprising:
maintaining, at the shared cache, a list comprising indications of slots from the first segment and the second segment which are free or occupied with data; and
receiving, at the shared cache, second data including a second plurality of data blocks; and
storing, at the shared cache, the second plurality of data blocks into free slots according to the list.

3. The method of claim 2, wherein the list comprises a continually rolling list using round-robin selection of one or more free slots for storing a next data block from the second plurality of data blocks, and wherein the list comprises a list that allows lock free concurrent access by a plurality of threads.

4. The method of claim 2, further comprising:
determining, at the shared cache, that there is not enough room among the plurality of segments for storing the second plurality of data blocks;
allocating, at the shared cache, at least a third segment and a fourth segment; and
adding, at the shared cache, indications to the list corresponding to slots from the third segment and the fourth segment.

5. The method of claim 1, wherein storing the first data block within the first slot comprises replacing at least a portion of padding within the first slot with information contained in the first data block, wherein the method further comprises deallocating the first slot, wherein deallocating the first slot comprises filling the first slot with padding.

6. The method of claim 1, wherein each of the plurality of segments are 128 bytes in length, wherein each of the plurality of first and second slots are 32 bytes in length, and wherein each of the plurality of data blocks are less than or equal to 32 bytes in length.

7. The method of claim 1, wherein a computing apparatus comprising the shared cache forms at least a portion of a database management system, and wherein the database management system utilizes an in-memory database.

8. An apparatus comprising:
at least one data processor; and
at least one memory storing instructions which, when executed by the at least one data processor, result in operations comprising:
allocating, at a shared cache, a plurality of segments including a first segment and a second segment, wherein the first segment is allocated to include a plurality of first slots for data storage, wherein the second segment is allocated to include a plurality of second slots for data storage, and wherein each of the plurality of first slots and each of the plurality of second slots is of a fixed slot size;
receiving, at the shared cache, data including a plurality of data blocks, the plurality of data blocks including a first data block and a second data block adjacent to the first data block, wherein data contained in the first data block is for a first processing core of a multi-core processor, and wherein data contained in the second data block is for a second processing core of the multi-core processor;
determining a first offset based on a total number of processing cores of the multi-core processor, the fixed slot size, and a first allocation number;
storing, at the shared cache, the first data block within a first slot of the plurality of first slots of the first segment, wherein a location of the first slot is determined based on a starting location of a memory of the shared cache and the first offset, and wherein the first segment is assigned, by the shared cache, to be accessed by the first processing core of the multi-core processor;
updating, in response to storing the first data block, the first allocation number to produce a second allocation number;
determining a second offset based on the total number of processing cores of the multi-core processor, the fixed slot size, and the second allocation number; and
storing, at the shared cache, the second data block within a second slot of the plurality of second slots of the second segment, wherein a location of the second slot is determined based on the starting location of the memory of the shared cache and the second offset, wherein the second segment is assigned, by the shared cache, to be accessed by the second processing core of the multi-core processor, and wherein the first slot and the second slot are not adjacent.

9. The apparatus of claim 8, wherein the operations further comprise:
maintaining, at the shared cache, a list comprising indications of data slots from the first segment and the second segment which are free or occupied with data;
receiving, at the shared cache, second data including a second plurality of data blocks; and
storing, at the shared cache, the second plurality of data blocks into free slots according to the list, wherein the list comprises a continually rolling list using round-robin selection of one or more free slots for storing a next data block from the second plurality of data blocks, and wherein the list comprises a list that allows lock free concurrent access by a plurality of threads.

10. The apparatus of claim 9, wherein the operations further comprise:
determining, at the shared cache, that the first segment and the second segment are full;
allocating, at the shared cache, at least a third segment and a fourth segment; and
adding, at the shared cache, indications to the list of data slots from the third segment and the fourth segment which are free or occupied with data.

11. A non-transitory computer program product storing instructions which, when executed by at least one data processor, causes operations comprising:
allocating, at a shared cache, a plurality of segments including a first segment and a second segment, wherein the first segment is allocated to include a plurality of first slots for data storage, wherein the second segment is allocated to include a plurality of second slots for data storage, and wherein each of the plurality of first slots and each of the plurality of second slots is of a fixed slot size;
receiving, at the shared cache, data including a plurality of data blocks, the plurality of data blocks including a first data block and a second data block adjacent to the first data block, wherein data contained in the first data block is for a first processing core of a multi-core processor, and wherein data contained in the second data block is for a second processing core of the multi-core processor;

determining a first offset based on a total number of processing cores of the multi-core processor, the fixed slot size, and a first allocation number;

storing, at the shared cache, the first data block within a first slot of the plurality of first slots of the first segment, wherein a location of the first slot is determined based on a starting location of a memory of the shared cache and the first offset, and wherein the first segment is assigned, by the shared cache, to be accessed by the first processing core of the multi-core processor;

updating, in response to storing the first data block, the first allocation number to produce a second allocation number;

determining a second offset based on the total number of processing cores of the multi-core processor, the fixed slot size, and the second allocation number; and storing, at the shared cache, the second data block within a second slot of the plurality of second slots of the second segment, wherein a location of the second slot is determined based on the starting location of the memory of the shared cache and the second offset, wherein the second segment is assigned, by the shared cache, to be accessed by the second processing core of the multi-core processor, and wherein the first slot and the second slot are not adjacent.

12. The non-transitory computer program product of claim 11, wherein the operations further comprise:

maintaining, at the shared cache, a list comprising indications of data slots from the first segment and the second segment which are free or occupied with data;

receiving, at the shared cache, second data including a second plurality of data blocks; and storing, at the shared cache, the second plurality of data blocks into free slots according to the list, wherein the list comprises a continually rolling list using round-robin selection of one or more free slots for storing a next data block from the second plurality of data blocks, and wherein the list comprises a list that allows lock free concurrent access by a plurality of threads.

13. The non-transitory computer program product of claim 12, wherein the operations further comprise:

determining, at the shared cache, that the first segment and the second segment are full;

allocating, at the shared cache, at least a third segment and a fourth segment; and adding, at the shared cache, indications to the list of data slots from the third segment and the fourth segment which are free or occupied with data.

* * * * *